US006448741B1

(12) United States Patent
Inui et al.

(10) Patent No.: US 6,448,741 B1
(45) Date of Patent: Sep. 10, 2002

(54) TEMPERATURE CONTROL METHOD AND STRUCTURE FOR A BATTERY PACK

(75) Inventors: Kiwamu Inui, Toyohashi; Toshiyuki Sekimori; Toyohiko Eto, both of Toyota, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/763,622

(22) PCT Filed: Sep. 3, 1999

(86) PCT No.: PCT/JP99/04813

§ 371 (c)(1), (2), (4) Date: Mar. 5, 2001

(87) PCT Pub. No.: WO00/14822

PCT Pub. Date: Mar. 16, 2000

(30) Foreign Application Priority Data

Sep. 3, 1998 (JP) .......................................... 10-249332

(51) Int. Cl.[7] .................................................. H02J 7/00
(52) U.S. Cl. ...................................................... 320/107
(58) Field of Search ........................... 320/107; 429/99, 429/120

(56) References Cited

U.S. PATENT DOCUMENTS 4,522,898 A 6/1985 Esrom ........................ 429/120
5,304,434 A * 4/1994 Stone .......................... 429/99
5,879,833 A 3/1999 Yoshii et al. ................. 429/62
6,087,038 A * 7/2000 Flament et al. ............. 429/120
6,211,645 B1 * 7/2000 Kouzu et al. ............... 320/107
6,211,646 B1 * 7/2000 Kouzu et al. ............... 320/107
6,111,387 A * 8/2000 Kouzu et al. ............... 320/107

FOREIGN PATENT DOCUMENTS

| | | |
|---|---|---|
| EP | 0576138 | 12/1993 |
| EP | 0869571 | 10/1998 |
| JP | 59171476 | 9/1984 |
| JP | 10003950 | 1/1998 |
| JP | 10106520 | 4/1998 |
| JP | 10106521 | 4/1998 |
| JP | 10255859 | 9/1998 |
| JP | 10270095 | 10/1998 |
| JP | 10334953 | 12/1998 |

OTHER PUBLICATIONS

English Language Abstract of JP 10–106520.
English Language Abstract of JP 10–106521.
English Language Abstract of JP 10–255859.
English Language Abstract of JP 10–270095.
English Language Abstract of JP 10–003950.

* cited by examiner

*Primary Examiner*—Edward H. Tso
*Assistant Examiner*—Pia Tibbits
(74) *Attorney, Agent, or Firm*—Greenblum & Bernstein, P.L.C.

(57) ABSTRACT

Cylindrical battery modules (9) composed of a plurality of serially connected cells (7) and arranged in parallel and stacked in piles within a holder case (10) are cooled with a forced current of air supplied from the underside. The battery modules (9*a*) located on the most upstream side of the air current are covered with film tubes (2), so as to prevent them from being cooled more than the other battery modules (9), thereby achieving uniformity in the temperatures of the battery modules. Temperature equalization is further improved by providing film tubes (2) to the several tiers of the battery modules such that the film tubes for covering upstream battery modules (9) have larger diameters than those for downstream battery modules.

11 Claims, 7 Drawing Sheets

TEMPERATURE CONTROL METHOD AND STRUCTURE FOR A BATTERY PACK

TECHNICAL FIELD

The present invention relates to a battery pack having a desired output power and composed of a plurality of stacked battery modules each including a plurality of serially-connected cells, and a temperature control method and structure for this battery pack for equalizing the temperature of each battery module.

BACKGROUND ART

It is known in the prior art to constitute a battery module by connecting a plurality of cells in series to attain a larger output voltage, because discrete cells have only a small output voltage of about 1 V to 4 V. Such battery modules are further connected in series with each other for obtaining an even higher output voltage. Generally, a battery power source device having high output power is designed as a battery pack wherein a plurality of battery modules are arranged horizontally and stacked vertically in a holder case. Each of the large number of cells constituting the battery power source device is a rechargeable battery, and control is effected with respect to charging and discharging of the battery pack for obtaining the desired power.

Charging and discharging of rechargeable batteries involve generation of heat, and it is necessary to cool the battery pack in which a large number of cells are stacked, in order to prevent an excessive rise in temperature. On the contrary, in an application in a cold location where the temperature is below an adequate level for the battery, it may become necessary to heat the battery pack so as to prevent deterioration of the battery performance. It is also necessary to maintain all of the stacked cells at an equal temperature, because the battery properties change depending on the temperature of the battery.

For the temperature control of a battery pack, it is known in the art to employ a cooling structure as shown in FIG. 8, wherein a forced current of air is supplied from the underside of the holder case 10 of a battery pack 30 and passed between the plurality of battery modules 9 arranged horizontally and stacked vertically within the holder case 10.

However, in this cooling structure for a battery pack, as indicated by a broken line in the graph of FIG. 8, the air temperature $T_a$ increases by the heat of battery modules 9 as the air flows upwards. Therefore, while the lowermost battery modules 9 are effectively cooled by the low-temperature air, those battery modules 9 located at higher tiers are poorly cooled because the temperature of the air has been increased due to heat exchange with the battery modules 9 of the lower tiers. As a result, the battery temperature $T_B$ is not uniform as indicated by the two dot chain line in FIG. 8, i.e., there is a large difference between the temperature $TB_B$1 of the lowermost battery modules 9 and those $T_B$3, $T_B$5, $T_B$7 of the other battery modules 9. Thus the battery modules 9 are not cooled uniformly.

It is an object of the present invention to provide a temperature control method and structure for a battery pack in which a plurality of battery modules are stacked, for maintaining each of the battery modules at an equal temperature.

DISCLOSURE OF THE INVENTION

In order to achieve the above-mentioned object, the present invention provides a temperature control method for a battery pack wherein a plurality of battery modules including a plurality of serially connected cells are arranged in parallel and stacked in piles within a holder case. A forced current of air is supplied into the holder case in a direction in which the battery modules are stacked for adjusting the temperatures of the battery modules. According to the invention, the battery modules located on an upstream side of the air current are covered with film tubes such as to form a gap between the battery module and the film tube, and the gap is made larger in battery modules which are located at a position with good heat exchange conditions.

With this temperature control method, the battery modules located on the upstream side of the air current are covered with film tubes to reduce the heat exchange efficiency thereof. The battery modules located upstream of the air current where good heat exchange is achieved are covered with film tubes with greater spaces between the surface of the battery modules and the film tubes. Accordingly, the heat exchange efficiency of the upstream battery modules provided with greater spaces between themselves and the film tubes is lowered. Such space between the battery module and the film tube is adjusted corresponding to the temperature of air current, whereby the temperatures of various battery modules are controlled to be equal. The battery characteristics dependent on temperature are thus equalized to enable the battery pack to exhibit high performance.

A temperature control structure according to the invention includes means for providing a forced current of air into the holder case in a direction in which the battery modules are stacked, and a plurality of film tubes respectively fitted on a plurality of battery modules located on an upstream side of the air current such as to form a gap between the battery module and the film tube. The gap is adjustable in size and made larger in battery modules which are located at a position with good heat exchange conditions.

The heat exchange efficiency of the battery modules covered with film tubes is lowered because of an air layer formed between the battery modules and the film tubes. Accordingly, the film tubes are fitted on the battery modules on the upstream side of the air current, whereby there is little difference in temperatures of a number of stacked battery modules.

Part of the battery modules is provided with a spacer, and the film tube is fitted on the spacer such that the battery module is covered with the film tube. The thickness of the spacer is varied for adjusting the size of the gap between the battery module and the film tube. The heat exchange efficiency of each battery module is thus adjusted by the thickness of the air layer formed between the battery module and the film tube.

The film tube may be composed of a resin film formed in a cylindrical shape. In this way, the thickness of the air layer, which affects the heat exchange efficiency of battery module, is simply adjusted by changing the diameter of the film tube.

The film tube may be formed of a resin film having a width greater than the circumference of a battery module. When wrapped into a cylindrical shape with the side edges being overlapped and joined together, it forms a tube having a diameter larger than the circumference of the battery module. In this way, reductions in cost and in space for storage and transfer are achieved in comparison to fabrication of resin films in cylindrical form.

Furthermore, the film tube may be formed of a resin film rolled into a cylindrical shape having a width such as to surround a battery module with a largest gap between the battery module and the film tube fitted thereon. In this way, film tubes having various different diameters are all formed of resin films of the same size.

BEST MODE FOR CARRYING OUT THE INVENTION

Preferred embodiments of the present invention will be hereinafter described with reference to the accompanying drawings for an understanding of the present invention. It should be understood that the following is only an example of embodiment of the invention, and does not limit the scope of the claims.

Figure 1:
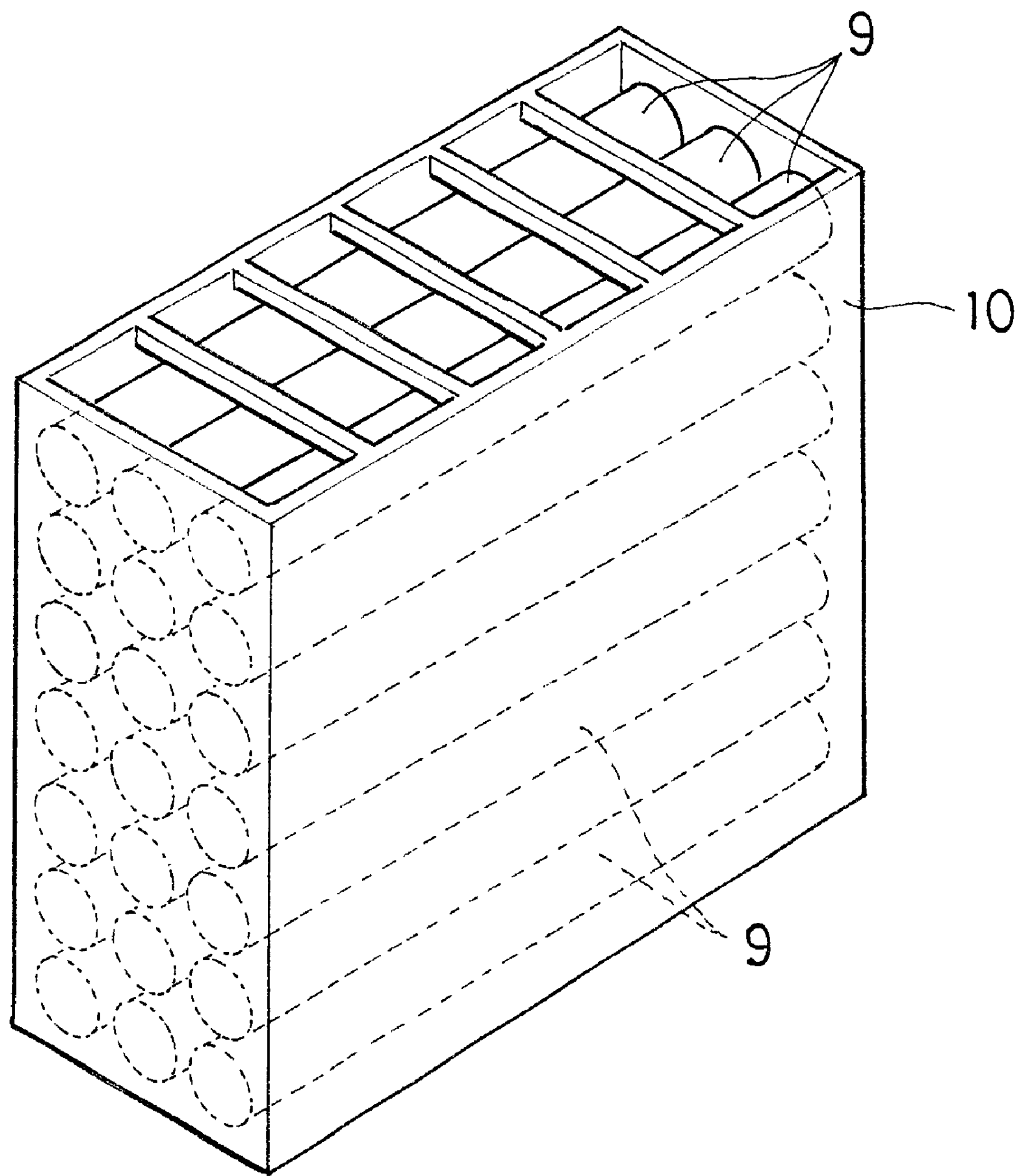
FIG. 1 is a perspective view showing the battery pack in accordance with one embodiment of the present invention.

FIG. 1 shows the arrangement of a packed battery according to one embodiment of the present invention. This embodiment is adapted for use in a vehicle which uses an electric motor in combination with a combustion engine as a power source. Battery modules 9 are arranged in parallel in three rows and stacked vertically in seven tiers within a holder case 10 and they are all connected in series. Each of the battery modules 9 is composed of six cells of nickel metal hydride rechargeable battery connected in series.

Figure 2:
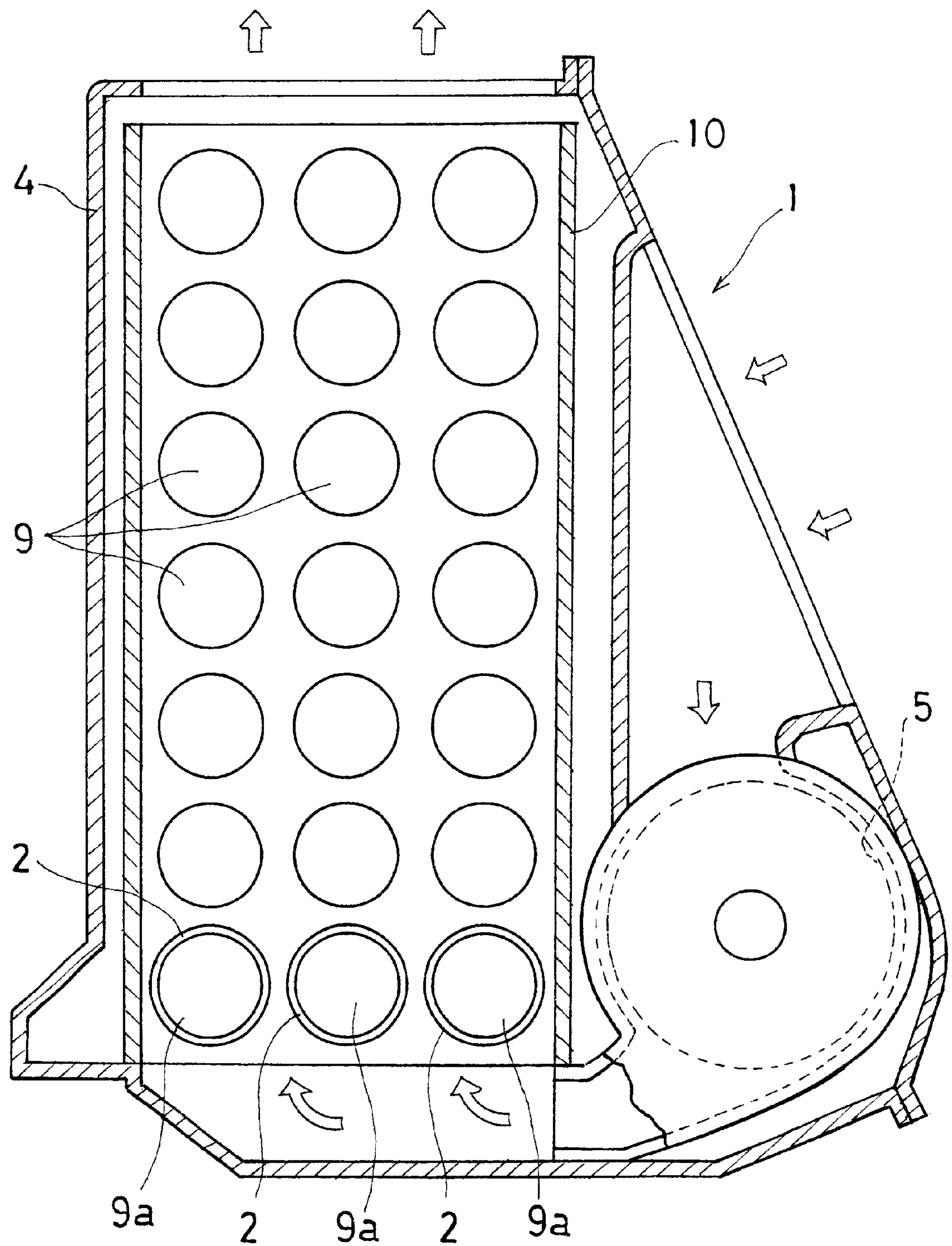
FIG. 2 is a cross sectional view showing the cooling structure for a battery pack according to the embodiment of the invention.

The holder case 10 accommodating the plurality of battery modules 9 is secured inside an outer case 4 to constitute a battery power source device 1 as shown in FIG. 2. In operation, the battery modules 9 are cooled by providing a forced current of air (cooling medium) into the holder case 10 from a lower side by a blower 5. The air temperature rises as the air flows upwards due to heat exchange with the vertically stacked battery modules 9, and there will be a difference between the temperature of the battery modules 9*a* located most upstream of the flow of air and the temperature of the battery modules 9 on the downstream side. It is essential to achieve uniformity in the temperature of each of the cells 7 in such stacked arrangement for ensuring stable operation of the battery power source device 1, because the battery characteristics such as battery capacity and charge/discharge efficiency are affected by temperature. However, the temperature of the battery modules 9*a* located most upstream of the flow of air tends to become low due to the higher cooling effect as mentioned above as compared to other battery modules 9.

Figure 4:
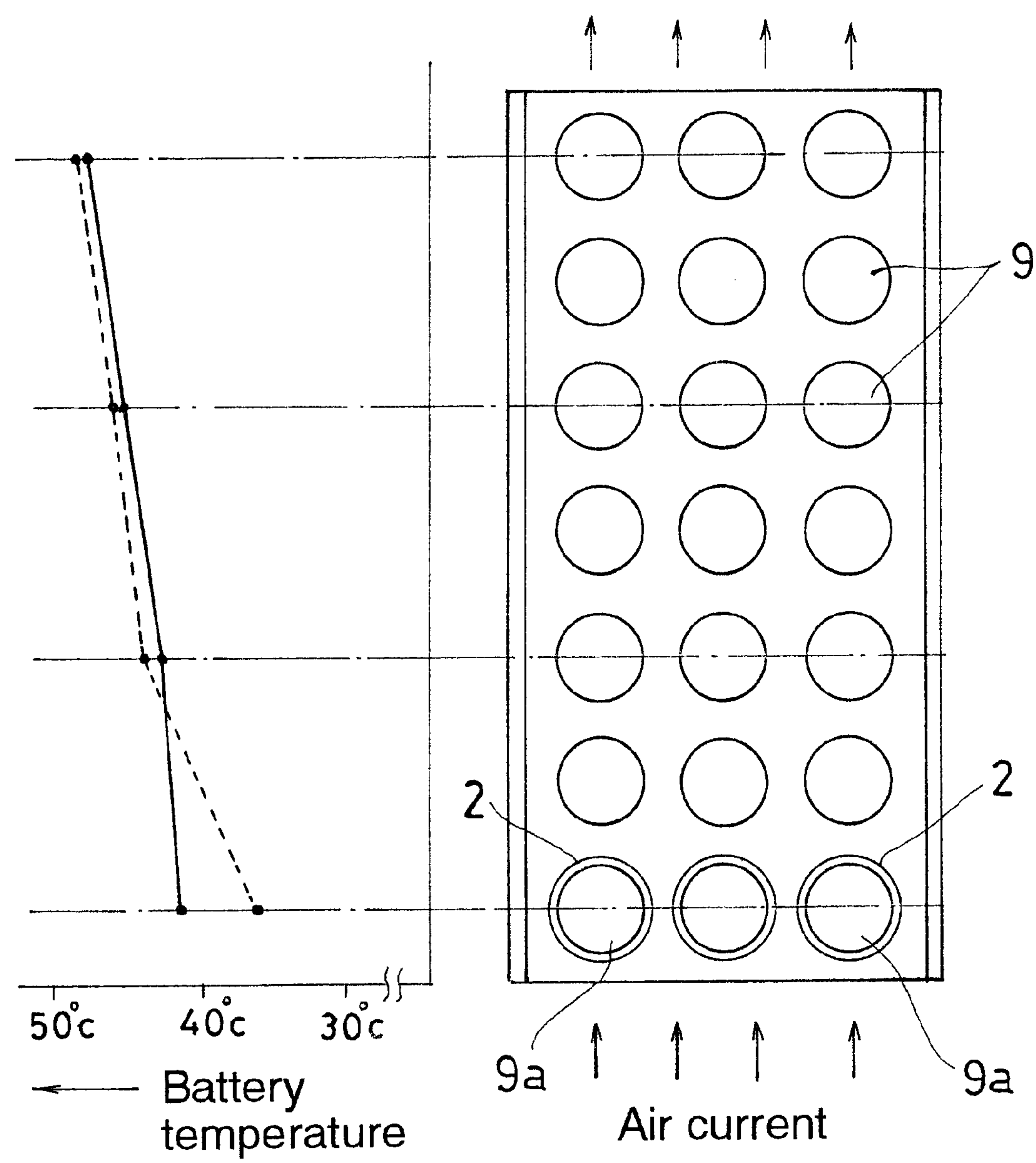
FIG. 4 is a diagram showing the side view of the battery pack in combination with a graph indicating the battery temperatures.

Therefore, according to the invention, the three battery modules 9*a* on the most upstream side of the flow of air are covered with film tubes 2 made of polyethylene terephthalate (PET), so that they are not exposed to the air current. Moreover, an air layer is formed between the battery module 9 and the film tube 2, whereby the cooling effect by the air current is further lowered. For the purpose of comparison, the variation in the temperature of the battery modules 9 in the case where the upstream battery modules 9*a* are not covered with the film tubes 2 is illustrated by broken lines in FIG. 4. The solid line in the graph of FIG. 4 indicates that there is less variation in the temperature of the battery modules 9 when the lowermost battery modules 9*a* are covered with the film tubes 2. This is because the temperature of the most upstream battery modules 9*a* is raised due to the film tubes 2, and because the rise in temperature of the air current is controlled by these battery modules 9*a* on the upstream side. As a result, the increase in the temperature of the other battery modules is restricted, resulting in less variation in temperature.

Figure 3:
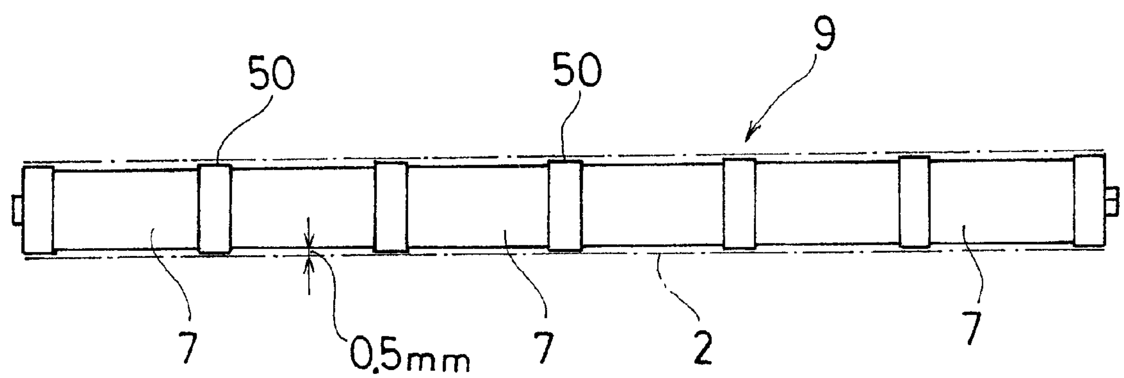
FIG. 3 is a side view showing a battery module.

The battery module 9 is composed of six cells 7 that are electrically connected in series and mechanically coupled by spot welding via connecting rings 50 as shown in FIG. 3. The film tube 2 has an inner diameter equal to the diameter of the connecting ring 50, and when the battery module is covered with the film tube 2, a small gap of about 0.5 mm is formed between the film tube 2 and the surface of each cell 7 as shown in the drawing.

With the structure of the embodiment described above, the lowermost battery modules 9*a* located on the most upstream side of the air current are prevented from being cooled more than necessary, but this is still insufficient for equalizing the temperatures of all of the battery modules. Another embodiment of the present invention described next provides an even better structure for cooling all of the battery modules equally.

Figure 5:
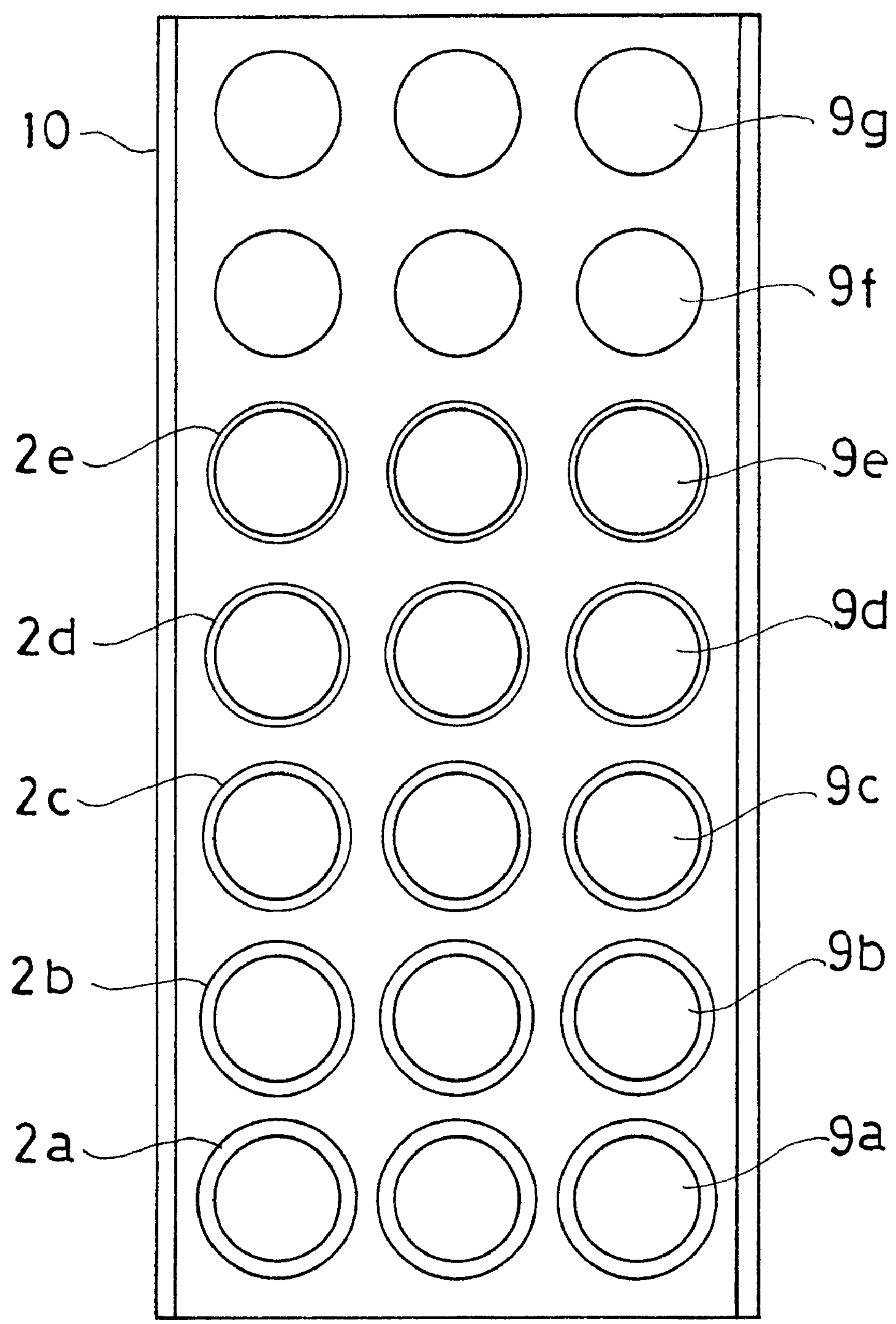
FIG. 5 is a side view showing the cooling structure for a battery pack according to another embodiment of the invention.

In this embodiment, as shown in FIG. 5, the battery modules 9*a* to 9*e* on the first to fifth tiers from the lower side are covered with respective film tubes 2*a* to 2*e*, having decreasing diameters in order from the upstream side of the air current. Thus the upstream battery modules are covered with film tubes of larger diameters. The cooling effect by the air current decreases as the thickness of the air layer surrounding battery modules increases, which is determined by the diameter of the film tubes.

Accordingly, the cooling effect by the air current increases as the air flows from the upstream side to the downstream side in this structure, counterbalancing the increasing temperature of the air. As a result, all of the battery modules on both upstream and downstream sides are kept at a substantially equal temperature.

Figure 6A:
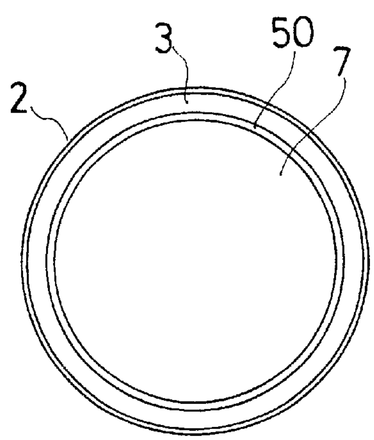
FIG. 6A is a cross sectional view and FIG. 6B is a side view, showing a film tube fitted to a battery module.
Figure 6B:
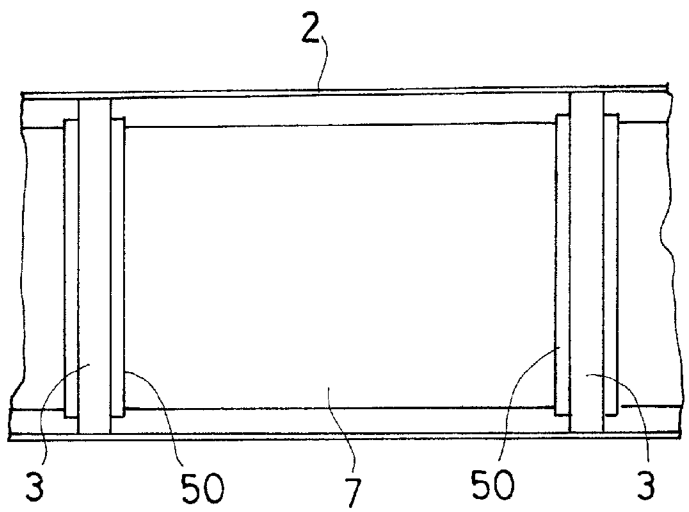

In order to cover the battery modules 9 with film tubes 2*a* to 2*e* having differing diameters, spacers 3 are fitted on the connecting rings 50 between adjacent cells 7, 7 as shown in FIGS. 6A and 6B. The thickness of the spacers 3 is variously set corresponding to the diameter of the film tubes 2 for providing a desired space between the surface of the battery module 9 and the film tube 2.

The film tubes 2*a* to 2*e* having respectively different diameters may be separately prepared, but this would lead to complications in the manufacture, storage, transfer, and so forth. Therefore, according to the invention, all of the film tubes 2*a* to 2*e* differing in their diameters are fabricated from resin films having common dimensions, thereby reducing fabrication cost and the labor involved in handling film tubes having various sizes.

Figure 7A:
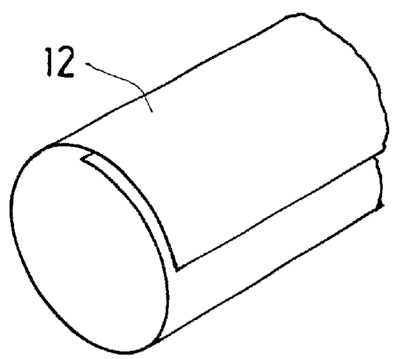
FIG. 7A is a perspective view of the resin film forming a film tube.
Figure 7B:
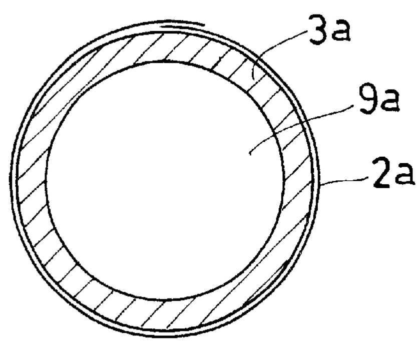
FIG. 7B is a cross sectional view of a battery module to which a film tube having a large diameter is fitted.
Figure 7C:
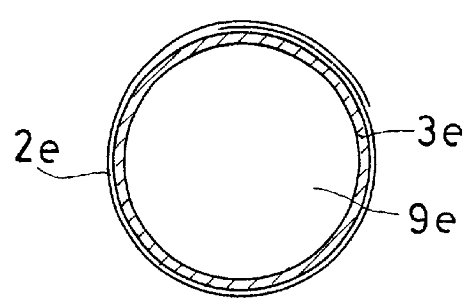
FIG. 7C is a cross sectional view of a battery module to which a film tube having a smaller diameter is fitted.
Figure 8:
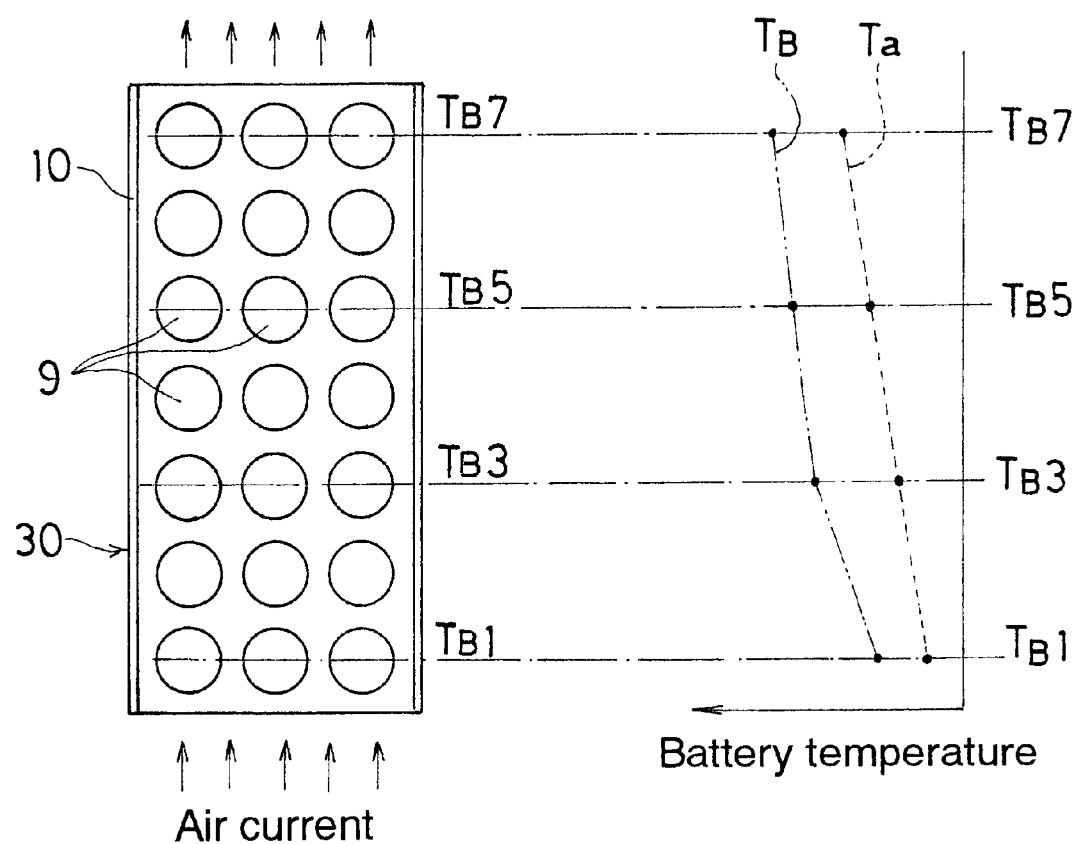
FIG. 8 is a diagram showing the side view of a battery pack without the temperature control structure of the invention in combination with a graph indicating the battery temperatures.

According to the invention, the film tubes 2 are formed by rolling a resin film 12 having a larger width than the circumference of a film tube 2_a_ having a largest diameter as shown in FIG. 7A. When used as the film tube 2_a_ having the largest diameter, the resin film 12 is wrapped around the spacer 3_a_ having a largest diameter and fitted on the battery module 9_a,_ and the side edges are overlapped and joined, as shown in FIG. 7B. When used as the film tube 2_e_ having the smallest diameter, the resin film 12 is wrapped around the spacer 3_e_ having a smallest diameter and fitted on the battery module 9_e,_ and the side edges are overlapped in a wider area and joined, as shown in FIG. 7C. Of course, resin films 12 having various differing widths, corresponding to the circumferences of film tubes 2_a_ to 2_e_ plus a certain overlapping length, may be separately prepared for forming tubes having various diameters.

In the structure described above, the diameter of the film tubes fitted to the battery modules 9 is varied from one tier to another of vertically stacked battery modules from an upstream side to a downstream side. It is of course possible, depending on temperature conditions, to equalize the temperature of all battery modules 9 by varying the diameter of the film tubes 2 from one row of seven stacked battery modules to another of the horizontal arrangement.

The embodiments given above have been described in connection with the temperature control effected by cooling the batteries. However, it is also possible to effect temperature control by using hot air as a medium, particularly in an application of the battery power source device in cold locations where the battery must be heated.

Industrial Applicability

According to the present invention, as described above, battery modules on the upstream side of an air current in a cell stacking arrangement are covered with film tubes for adjusting the temperatures of the battery modules. By providing the film tubes on the upstream battery modules, the heat exchange efficiency in the upstream of air current is lowered, and these battery modules are prevented from being cooled more than necessary in comparison to the other battery modules. Therefore, there is no large difference in temperature between the various battery modules. Moreover, battery modules on the upstream side are covered with film tubes with a larger gap therebetween than those on the downstream side so as to vary the thickness of air layer formed between the battery modules and the film tubes. Thereby, the heat exchange efficiency of various battery modules is varied, and all of the plurality of battery modules are kept at an equal temperature. The present invention thus offers various advantages for enabling a packed battery having a cell stacking arrangement which is susceptible to temperature changes to exhibit high performance.

What is claimed is:

1. A temperature control method for a battery pack wherein a plurality of battery modules comprising a plurality of serially connected cells are arranged in parallel and stacked in piles within a holder case, comprising the steps of:

providing a forced current of air into the holder case in a direction in which the battery modules are stacked; and covering battery modules located on an upstream side of the air current with film tubes such as to form a gap between the battery module and the film tube, wherein said gap is made larger in battery modules which are located at a position farthest upstream along the direction of the air current.

2. A temperature control structure for a battery pack wherein a plurality of battery modules comprising a plurality of serially connected cells are arranged in parallel and stacked in piles within a holder case, comprising:

means for providing a forced current of air into the holder case in a direction in which the battery modules are stacked; and a plurality of film tubes respectively fitted on a plurality of battery modules located on an upstream side of the air current such as to form a gap between the battery module and the film tube, wherein said gap is adjustable in size and made larger in battery modules which are located at a position farthest upstream along the direction of the air current.

3. The temperature control structure according to claim 2, wherein part of the battery module is provided with a spacer, and the film tube is fitted on the spacer for covering the battery module.

4. The temperature control structure according to claim 2, wherein the film tubes are made of a resin film formed in a cylindrical shape.

5. The temperature control structure according to claim 2, wherein the film tubes are formed of a resin film rolled into a cylindrical shape with both side edges thereof being overlapped and joined together, the resin film having a width greater than the circumference of a thus formed film tube covering the battery module with a gap therebetween.

6. The temperature control structure according to claim 2, wherein the battery modules are covered with film tubes having various diameters, the film tubes being formed of a resin film having such a width that when rolled into a cylindrical shape, the resin film surrounds the battery module with a largest gap therebetween.

7. A temperature control structure for a battery pack wherein a plurality of battery modules comprising a plurality of serially connected cells are arranged in parallel and stacked in piles within a holder case, comprising:

a device that provides a forced current of air into the holder case in a direction in which the battery modules are stacked; and a plurality of film tubes respectively fitted on a plurality of battery modules located on an upstream side of the air current such as to form a gap between the battery module and the film tube, wherein said gap is adjustable in size and made larger in battery modules which are located at a position farthest upstream along the direction of the air current.

8. The temperature control structure according to claim 7, wherein part of the battery module is provided with a spacer, and the film tube is fitted on the spacer for covering the battery module.

9. The temperature control structure according to claim 7, wherein the film tubes are made of a resin film formed in a cylindrical shape.

10. The temperature control structure according to claim 7, wherein the film tubes are formed of a resin film rolled into a cylindrical shape with both side edges thereof being overlapped and joined together, the resin film having a width greater than the circumference of a thus formed film tube covering the battery module with a gap therebetween.

11. The temperature control structure according to claim 7, wherein the battery modules are covered with film tubes having various diameters, the film tubes being formed of a resin film having such a width that when rolled into a cylindrical shape, the resin film surrounds the battery module with a largest gap therebetween.

* * * * *

UNITED STATES PATENT AND TRADEMARK OFFICE

CERTIFICATE OF CORRECTION

PATENT NO. : 6,448,741 B1
DATED : September 10, 2002
INVENTOR(S) : K. Inui et al.

It is certified that error appears in the above-identified patent and that said Letters Patent is hereby corrected as shown below:

Title page,
Item [57], ABSTRACT,
Line 2, after "modules" delete "(9)".
Line 3, after "cells" delete "(7)".
Line 4, after "case" delete "(10)".
Line 5, after "modules" delete "(9a)".
Line 6, after "tubes" delete "(2)".
Line 8, after "modules" delete "(9)".
Line 10, after "tubes" delete "(2)".
Line 12, after "modules" delete "(9)".

Signed and Sealed this

Third Day of June, 2003

JAMES E. ROGAN
*Director of the United States Patent and Trademark Office*